United States Patent [19]

Pattantyus

[11] Patent Number: 5,736,852
[45] Date of Patent: Apr. 7, 1998

[54] CIRCUIT AND METHOD FOR CONDITIONING A WHEEL SPEED SENSOR SIGNAL

[75] Inventor: Tamas Imre Pattantyus, North Olmsted, Ohio

[73] Assignee: AlliedSignal Truck Brake Systems Co., Elyria, Ohio

[21] Appl. No.: 493,253

[22] Filed: Jun. 21, 1995

[51] Int. Cl.⁶ .................. G01P 3/48; G01P 3/54; G01B 7/00; G01R 33/025
[52] U.S. Cl. .............. 324/166; 324/173; 324/207.12
[58] Field of Search .................. 324/166, 207.12, 324/225, 207.25, 160, 164, 168, 173, 174; 188/180, 181 R

[56] References Cited

U.S. PATENT DOCUMENTS

| | | |
|---|---|---|
| 3,769,534 | 10/1973 | Wroblewski et al. |
| 3,793,545 | 2/1974 | Leiber et al. |
| 3,939,373 | 2/1976 | Roberts |
| 4,293,814 | 10/1981 | Boyer ............... 324/207.25 |
| 4,761,609 | 8/1988 | Dorman et al. ............. 324/164 |
| 4,894,613 | 1/1990 | Tsugawa. |
| 4,953,670 | 9/1990 | Chemelewski. |

FOREIGN PATENT DOCUMENTS 1386020  3/1975  United Kingdom.

*Primary Examiner*—Walter E. Snow
*Attorney, Agent, or Firm*—Howard G. Massung

[57] ABSTRACT

In accordance with the teachings of the present invention, a wheel speed sensor signal conditioning circuit is provided for conditioning sensor output signals received from a variable reluctance wheel speed sensor. The conditioning circuit includes filtering circuitry and peak detecting circuitry that detects the positive and negative voltage peaks of a sensor output signal irrespective of the sensor output signal crossing a reference voltage level. When the sensor output signal exceeds a predetermined peak to peak voltage level, the peak detecting circuitry limits the amplitude of the output signal and forms a dynamic high pass filter. A comparator circuit is coupled to the peak detecting circuitry and outputs a first signal when the peak detecting circuitry detects a positive voltage peak and outputs a second signal when the peak detecting circuitry detects a negative voltage peak of the sensor output signal.

23 Claims, 2 Drawing Sheets

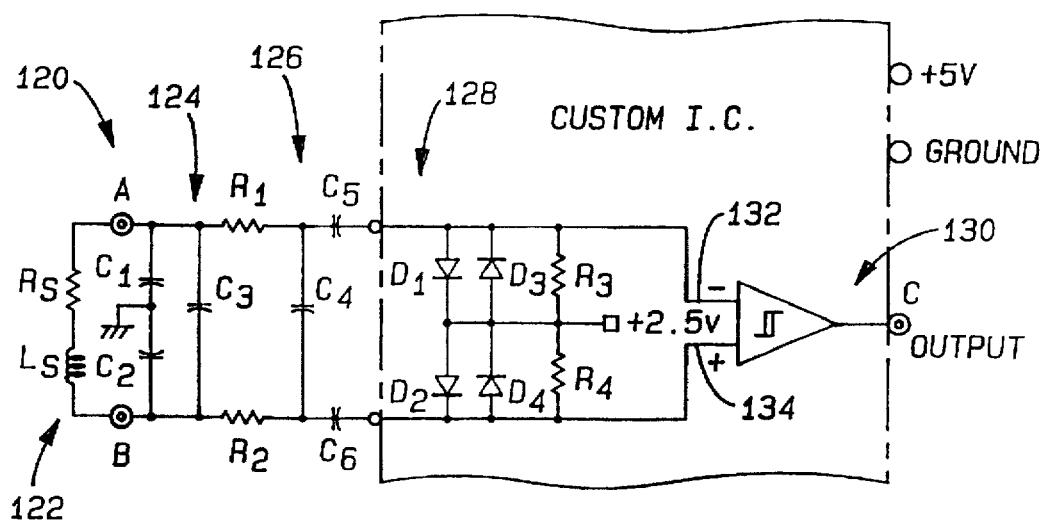
Fig-4
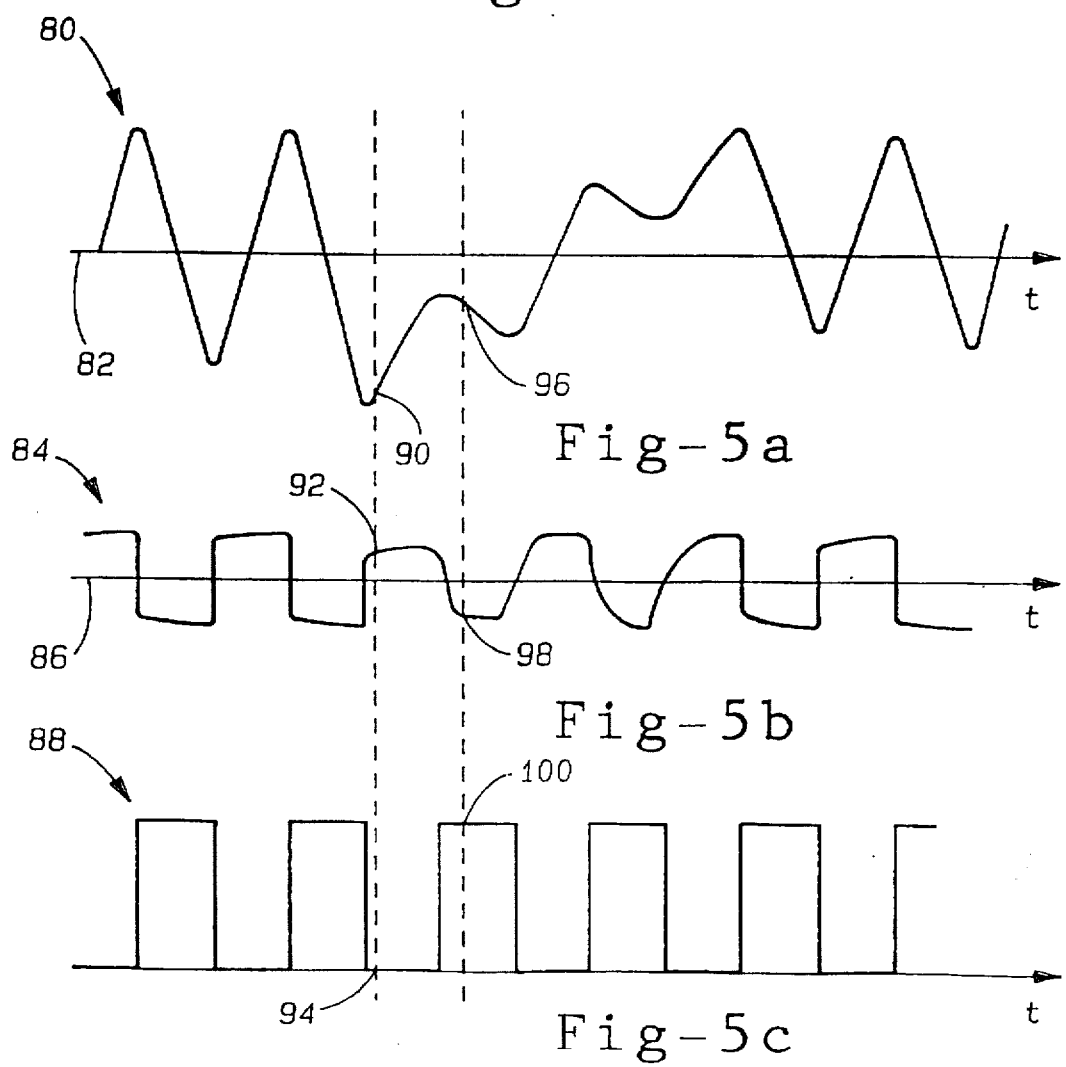
Fig-5a
Fig-5b
Fig-5c

CIRCUIT AND METHOD FOR CONDITIONING A WHEEL SPEED SENSOR SIGNAL

BACKGROUND OF THE INVENTION

1. Technical Field

This invention relates generally to sensor signal conditioning circuits and, more particularly, to a variable reluctance wheel speed sensor signal conditioning circuit having improved signal conditioning characteristics which may be used in conjunction with an anti-lock brake system for determining the wheel speed of a vehicle.

2. Discussion

Signal conditioning circuits are commonly used in anti-lock brake systems for conditioning sensor output signals in order to determine the wheel speed of a vehicle. A typical anti-lock brake system employs variable reluctance wheel speed sensors (VRWSS) that produce induced sinusoidal voltages that are used to calculate the speed of a vehicle's wheels. A standard VRWSS consists of a permanent magnet, a magnetic core surrounded by a coil, and a magnetic pole. Typically, a VRWSS is mounted on an axle of a vehicle in close proximity to a tone wheel which, in turn, is mounted to a respective wheel of the vehicle. A standard tone wheel is commonly made of a suitable ferro-magnetic material and includes a series of teeth and gaps that are evenly distributed along its circumference. An appropriately sized air gap exists between the tone wheel and the VRWSS such that as the tone wheel rotates in unison with the vehicle's wheel, the series of teeth and gaps cause magnetic flux changes within the VRWSS. This results the appearance of an induced voltage signal between the termination points of the coil of the VRWSS. This resulting voltage signal will be near sinusoidal and have an amplitude that is linearly proportional to the relative speed between the magnetic pole of the VRWSS and the tone wheel.

In the past, anti-lock brake systems have used the combination of a VRWSS and a tone wheel to measure the speed of a vehicle's wheel by determining the frequency of the resulting induced sinusoidal voltage signal. As will be apparent to one skilled in the art, when the radius and the number of teeth and gaps of a tone wheel are known, the frequency of the resulting induced sinusoidal voltage signal is linearly proportional to the tone wheel's speed. As a result, the frequency of the sinusoidal voltage signal induced in the VRWSS can be measured from the number of times the sinusoidal signal crosses a zero reference level. Thus, the speed of the vehicle's wheel can be calculated by a suitable anti-lock brake system microprocessor.

Unfortunately, a problem with such past systems is that strict measurement of the number of times a sinusoidal signal from a VRWSS crosses a zero reference voltage level is not reliable due to the accompanying effects of additive noise generated within such systems. For example, axial movements of a vehicle's wheel also causes axial movements of a corresponding tone wheel. Such movements cause the air gap which exists between the tone wheel and a VRWSS to change if the teeth and gaps are placed on the face of the tone wheel and the axis of the VRWSS is parallel with the wheel axle. This generates unwanted noise signals that cause the amplitude of the resulting induced sinusoidal voltage signal to vary in a manner such that as the air gap increases, the amplitude decreases and vice versa. In addition, this will add a momentary positive (or negative) voltage to the sinusoidal voltage. These changes in the amplitude and voltage level of the induced sinusoidal voltage signal may be severe enough such that a number of the signal's cycles will not properly cross the zero reference voltage level that is used as a reference for anti-lock brake systems that rely upon the detection of signal zero-crossings. This will effect the anti-lock brake system's ability to determine the signal's frequency and may result in the system interpreting the missed cycles as a sudden change in the wheel speed of the vehicle. Additionally, depending on the rate of change of the tone wheel's axial position, noise signals may be induced in the VRWSS due to the accompanying rate of change of the induced magnetic flux. Regardless of these problems, it is still economically advantageous to use variable reluctance wheel speed sensors due to their low cost and robustness when compared to other types of rotational velocity sensors.

It is therefore desirable to provide a sensor signal conditioning circuit that detects the positive and negative voltage peaks of a sinusoidal sensor output signal from which the frequency of the signal and the speed of a vehicle's wheel may be determined irrespective of whether the signal crosses a predetermined reference voltage level.

It is further desirable to provide a method for conditioning an output signal from a VRWSS employed in an anti-lock brake system which may be used for detecting changes in the speed of a vehicle's wheel.

SUMMARY OF THE INVENTION

In accordance with the teachings of the present invention, a speed sensor signal conditioning circuit is provided for detecting the positive and negative voltage peaks of an output signal received from a speed sensor. The conditioning circuit includes filtering circuitry and peak detecting circuitry that detects the positive and negative voltage peaks of the output signal irrespective of the output signal crossing a reference voltage level. A comparator circuit outputs a first signal when the peak detecting circuitry detects a positive voltage peak of the output signal and outputs a second signal when the peak detecting circuitry detects a negative voltage peak of the output signal. When the output signal exceeds a predetermined peak to peak voltage level, the peak detecting circuitry limits the amplitude of the output signal and forms a dynamic high pass filter.

According to one embodiment of this invention, the peak detecting circuitry includes a first diode, a second diode, and a first capacitor coupled to the filtering circuitry. The first and second diodes are connected in parallel with opposite polarities between the first capacitor and ground. When the output signal exceeds the predetermined peak to peak voltage level, the first and second diodes limit the amplitude of the output signal and provide a dynamic resistance that in conjunction with the first capacitor form a first high pass filter. When the output signal does not exceed the predetermined peak to peak voltage level, the first capacitor in addition to a second capacitor and a resistance form a second high pass filter for filtering low frequency noise from the output signal.

According to a second embodiment of this invention, the peak detecting circuitry includes a first pair of series connected diodes that have the same polarity and which are coupled between a first and a second capacitor. A second pair of series connected diodes are coupled in parallel with and have opposite polarities of the first pair of series connected diodes. When a predetermined peak to peak voltage level is exceeded, the first and the second pair of diodes limit the amplitude of the output signal and provide a dynamic resistance that forms a high pass filter in conjunction with the first and the second capacitors.

BRIEF DESCRIPTION OF THE DRAWINGS

Other objects and advantages of the present invention will become apparent to those skilled in the art upon reading the following detailed description and upon reference to the drawings in which:

FIG. 4 is a circuit diagram of the wheel speed sensor signal conditioning circuit in accordance with a second embodiment of the present invention;

FIG. 5a illustrates the disturbed induced voltage output signal from the variable reluctance wheel speed sensor provided in accordance with the present invention;

FIG. 5b illustrates the voltage signal appearing at node D of the circuit diagram of FIG. 3 in accordance with the present invention; and FIG. 5c illustrates the voltage signal appearing at node C of the circuit diagrams illustrated in FIG. 3 and FIG. 4 in accordance with the present invention.

DETAILED DESCRIPTION OF THE PREFERRED EMBODIMENTS

Figure 1:
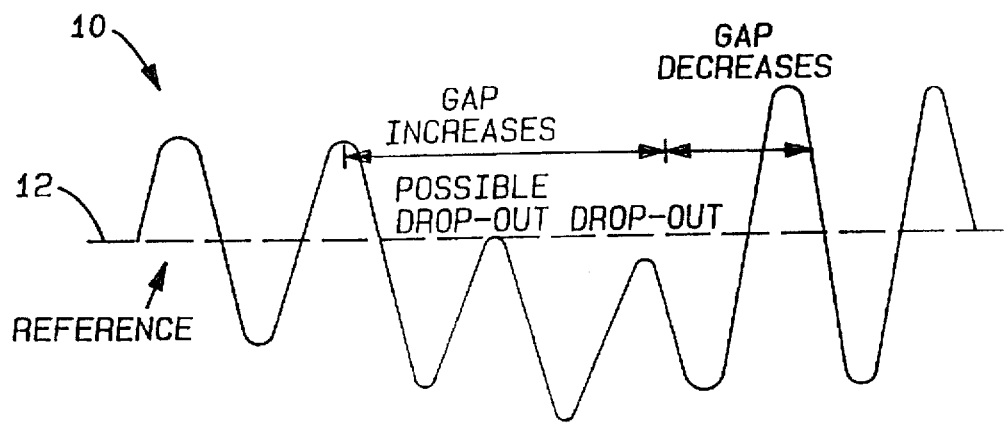
FIG. 1 illustrates an output voltage signal from a variable reluctance wheel speed sensor that has been disturbed by noise caused by changes in the air gap between the variable reluctance wheel speed sensor and a corresponding tone wheel.

Turning now to FIG. 1, an output voltage signal 10 illustrating an induced voltage signal received from a variable reluctance wheel speed sensor (VRWSS) is shown. The signal 10 illustrates how such an induced voltage signal may be disturbed by additive noise generated due to changes in the air gap between the VRWSS and a corresponding tone wheel. The frequency of the additive noise component of the signal 10 is typically less than the frequency of the signal component that is proportional to the wheel speed. As previously discussed, changes in the air gap may be caused by axial movements of a vehicle's wheel to which the tone wheel is mounted. These axial movements may be caused by many factors such as, but not limited to, parts of the vehicle flexing, movement of the wheel's bearings, or the vehicle's wheel being improperly aligned. As the signal 10 illustrates, when the air gap increases, the amplitude the signal 10 decreases, and when the air gap decreases, the amplitude of the signal 10 increases. Therefore, a number of the cycles of the signal 10, referred to as "possible drop-out" and "drop-out" cycles, do not properly reach a reference voltage level 12 that is typically used to determine the frequency of the signal 10. As a result, conventional zero-crossing detection methods which are commonly employed in anti-lock brake systems in order to detect changes in a vehicle's wheel speed by detecting the number of times a sinusoidal signal crosses a reference voltage level are not reliable or effective.

Figure 2:
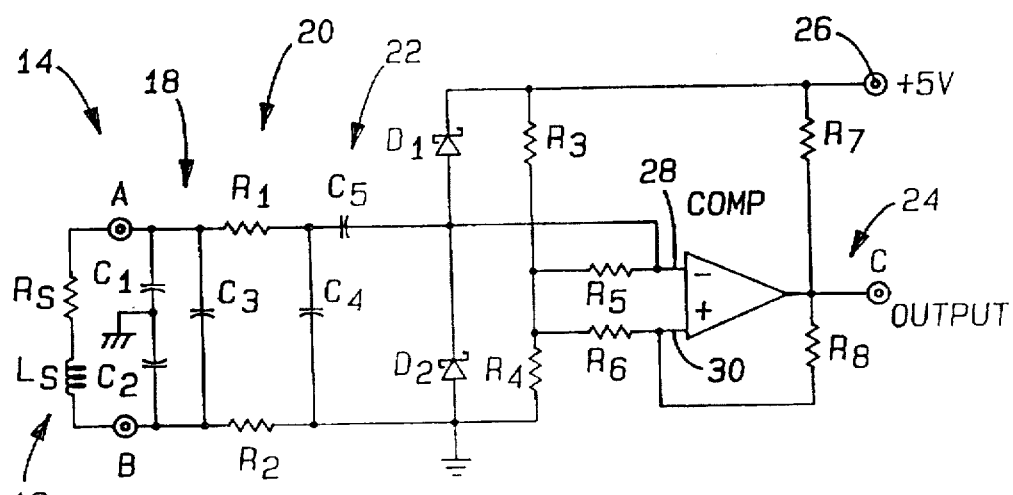
FIG. 2 is a circuit diagram of a prior art wheel speed sensor signal conditioning circuit.

Referring to FIG. 2, a conventional wheel speed sensor signal conditioning circuit 14 that employs a conventional zero-crossing detection method is shown. A variable reluctance wheel speed sensor (VRWSS) 16, coupled between nodes A and B, is illustrated by a resistance $R_s$ in series with an inductance $L_s$. The speed sensor 16 produces a sinusoidal voltage signal which may be represented by the signal 10 of FIG. 1. The signal 10 has a frequency that is indicative of the speed of a corresponding tone wheel attached to a wheel of a vehicle (not shown). As previously indicated, variable reluctance wheel speed sensors such as speed sensor 16 are well known in the art and their operation will be understood by one skilled in the art.

The wheel speed sensor signal conditioning circuit 14 includes a band-pass filter 18 formed from capacitors $C_1$, $C_2$ and $C_3$ in conjunction with the inductance $L_s$, a low-pass filter 20 formed from resistors $R_1$, $R_2$ and capacitor $C_4$, and a high-pass filter 22 formed from capacitor $C_5$ and resistor $R_5$. By way of example, the capacitors $C_1$ and $C_2$ each have a capacitance of 0.0047μ farads or less, capacitor $C_3$ has a capacitance of 0.0033μ farads, capacitor $C_4$ has a capacitance of 0.047μ farads, and capacitor $C_5$ has a capacitance of 0.47μ farads. Also by way of example, resistor $R_1$ has a resistance of 4.7k ohms, resistor $R_2$ has a resistance of 2k ohms, and resistor $R_5$ has a resistance of 10k ohms. The low-pass filter 20 has a high frequency limit of approximately 505 hertz, and the high-pass filter 22 has a low frequency limit of approximately 34 hertz. Diodes $D_1$ and $D_2$ are Schottky type diodes which limit the voltage of the signal 10 to approximately 5 volts peak to peak.

The signal conditioning circuit 14 further includes a comparator circuit 24 with an output line illustrated by node C. The comparator 24 is biased by a 5 volt voltage supply 26 with resistors $R_3$–$R_8$ being configured such that the inverting (−) input 28 and the non-inverting (+) input 30 of the comparator 24 are referenced to approximately a 2.5 volt level. Additionally, resistors $R_6$ and $R_8$ are configured to provide positive feedback control for controlling the sensitivity of the comparator 24. By way of example, resistors $R_3$ and $R_4$ have a resistance of 2k ohms, resistor $R_6$ has a resistance of 10k ohms, resistor $R_7$ has a resistance of 3.3k ohms, and resistor $R_8$ has a resistance of 511k ohms.

In operation, a sinusoidal voltage signal such as the signal 10 of FIG. 1 is applied to the band-pass filter 18, the low-pass filter 20, and the high-pass filter 22. The signal 10 has a frequency of approximately 700 hertz which corresponds to a vehicle's wheel speed of approximately fifty miles per hour. The comparator 24 is configured to output a signal at node C that switches between a high and a low voltage level every time the signal 10 crosses the reference voltage level 12. The low-pass filter 20 provides some compensation for the increasing amplitude of the signal 10 as the vehicle's speed increases. The high-pass filter 22 is supposed to remove low frequency noise signals induced by axial movements of the vehicle's wheel that most often occur at moderately high speeds in excess of forty miles per hour. However, as will be apparent to one skilled in the art, the majority of the disturbances or low frequency noise will have frequencies greater than 34 hertz. Thus, the signal 10 will pass practically unattenuated through the filters 18, 20 and 22. As a result, during the cycles labeled "possible drop-out" and "drop-out", the signal conditioning circuit 14 may fail to respond properly due to the appearance of low frequency noise. This is because both the non-inverting (+) input 30 and the inverting (−) input 28 of the comparator 24 are referenced to the 2.5 volt reference voltage level, with the non-inverting (+) input 30 being slightly modified by the positive feedback. As a consequence, the comparator 24 will not switch between the high and low voltage levels during the "possible drop-out" and "drop-out" cycles. When used as part of a typical anti-lock brake system, such missed cycles may be interpreted by an applicable microprocessor as a sudden change in the wheel speed of the vehicle which typically occurs when the wheels of the vehicle lock up in an emergency braking situation.

Figure 3:
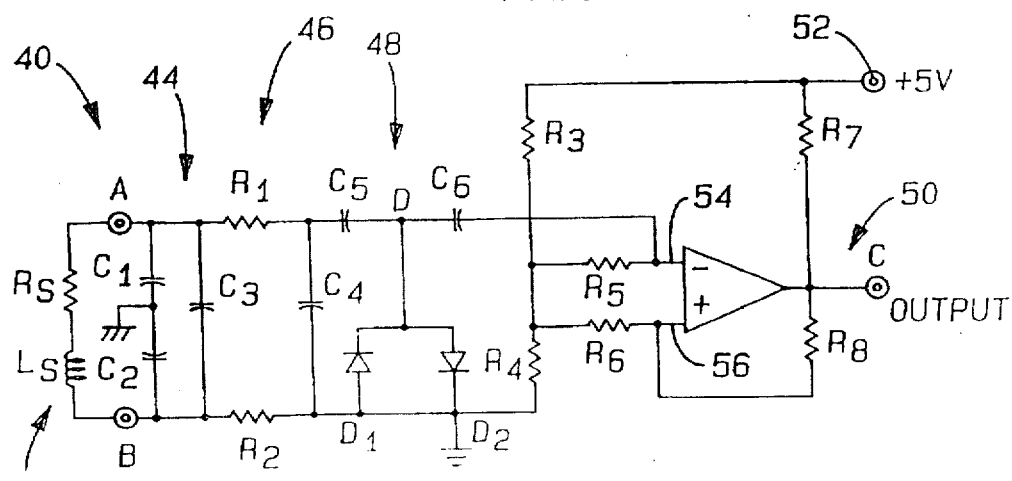
FIG. 3 is a circuit diagram of the wheel speed sensor signal conditioning circuit in accordance with a first embodiment of the present invention.

Turning now to FIG. 3, a wheel speed sensor signal conditioning circuit 40 in accordance with a first embodiment of the invention is shown. As with the signal conditioning circuit 14 of FIG. 2, a variable reluctance wheel speed sensor (VRWSS) 42, coupled between nodes A and B, is illustrated by a resistance $R_s$ in series with an inductance $L_s$. The VRWSS 42 produces a sinusoidal voltage signal that is indicative of the speed of a corresponding tone wheel attached to a vehicle's wheel (not shown). When used as part of an anti-lock brake system, this voltage signal is used by an applicable microprocessor to determine the speed of the vehicle's wheel. The signal conditioning circuit 40 includes a band-pass filter 44 formed from capacitors $C_1$, $C_2$ and $C_3$ in conjunction with the inductance $L_s$, and a low-pass filter 46 which is formed from resistors $R_1$, $R_2$ and capacitor $C_4$. By way of example, capacitors $C_1$ and $C_2$ each preferably have a capacitance of $0.0047\mu$ farads or less, capacitor $C_3$ preferably has a capacitance of $0.0033\mu$ farads, and capacitor $C_4$ preferably has a capacitance of $0.047\mu$ farads. Also by way of example, resistor $R_1$ preferably has a resistance of 4.7k ohms and resistor $R_2$ preferably has a resistance of 2k ohms.

The low-pass filter 46 is coupled to a peak detecting circuit 48 formed from diode $D_1$, diode $D_2$, and capacitor $C_5$. Diodes $D_1$ and $D_2$ are connected in parallel with opposite polarities between node D and ground. Diodes $D_1$ and $D_2$ are preferably signal diodes that exhibit a forward voltage drop of approximately 0.6 volts as opposed to rectifying diodes.

The signal conditioning circuit 40 further includes a comparator circuit 50 with an output line illustrated by node C. By way of example, comparator 50 may be a linear CMOS device such as a TLC374 available from Texas Instruments Inc., an automotive grade linear bi-polar device such as a LM2901 available from National Semiconductor Co., or any other suitable comparator device. The comparator 50 is connected to a 5 volt voltage supply 52 with resistors $R_3$–$R_8$ being configured such that an inverting (–) input 54 and a non-inverting (+) input 56 are referenced to approximately a 2.5 volt level. The inverting (–) input 54 is capacitively coupled to node D of the peak detecting circuit 48 by capacitor $C_6$. Additionally, resistors $R_6$ and $R_8$ are configured to provide hysteresis in the switching action of the comparator 50 through positive feedback. As such, the non-inverting (+) input 56 of the comparator 50 will be a few percent more positive than the 2.5 volt bias voltage when the voltage at node C is at a high level of 5 volts. Similarly, the non-inverting (+) input 56 of the comparator 50 will be a few percent more negative than the 2.5 volt bias voltage when voltage at node C is at a low level of 0 volts. By way of example, capacitors $C_5$ and $C_6$ preferably have capacitances of $0.47\mu$ farads. Also by way of example, resistors $R_3$ and $R_4$ preferably have resistances within the range of approximately 1k to 2k ohms, resistor $R_5$ preferably has a resistance of 200k ohms, resistor $R_6$ preferably has a resistance of 10k ohms, resistor $R_7$ preferably has a resistance of 3.3k ohms, and resistor $R_8$ preferably has a resistance of 511k ohms.

Next, the operation of the wheel speed sensor signal conditioning circuit 40 will be explained with reference to FIGS. 5a–5c. The signal 80 of FIG. 5a represents an induced sinusoidal voltage signal generated between nodes A and B of the signal conditioning circuit 40 by the VRWSS 42 and the corresponding tone wheel. As with the signal 10 of FIG. 1, the signal 80 illustrates the effects of additive noise generated due to changes in the air gap between the VRWSS 42 and the corresponding tone wheel. As previously discussed, the frequency of such additive noise components of the signal 80 are typically less than the frequency of the signal component that is proportional to a vehicle's wheel speed. Because of these additive noise components, a number of the cycles of the signal 80 do not consistently cross a reference voltage level 82 that represents the voltage appearing at the non-inverting (+) input 56 of the comparator 50. The signal 84 of FIG. 5b is referenced to a ground reference level 86 and illustrates the voltage signal generated between node D and ground of the signal conditioning circuit 40. The signal 88 of FIG. 5c illustrates how the output signal appearing at node C of the comparator 50 switches between the high voltage level of 5 volts and the low voltage level of 0 volts in response to changes in the voltage level of the signal 84.

In operation, the sinusoidal voltage signal 80 is applied to the band-pass filter 44 and the low-pass filter 46. As with the signal 10 of FIG. 1, the signal 80 has a frequency of approximately 700 hertz which corresponds to a vehicle's wheel speed of approximately fifty miles per hour. The low-pass filter 46 provides some compensation for the increasing amplitude of the signal 80 as the vehicle's speed increases. The signal 80 is then coupled to the peak detecting circuit 48. The signal 84 generated by the peak detecting circuit 48 for detecting positive and negative voltage peaks of the signal 80 is in turn coupled to the inverting (–) input 54 of the comparator 50 by a high pass filter formed from the capacitor $C_6$ in conjunction with the resistor $R_5$.

When the amplitude of the signal 80 exceeds approximately 1.2 volts peak to peak, the voltage level required to cause diodes $D_1$ and $D_2$ to conduct in subsequent half cycles, the peak detecting circuit 48 clamps or limits the signal 80 to a peak to peak voltage level equal to approximately two forward diode voltage drops. This limiting function of the peak detecting circuit 48 is illustrated by the signal 84 of FIG. 5b and corresponds to the voltage drops across diode D1 and diode D2 during subsequent half cycles of the signal 80.

In addition to limiting the signal 80, the peak detecting circuit 48 detects the positive and negative voltage peaks or transitions of the signal 80 by generating the signal 84 that varies in a generally symmetrical manner about the ground reference level 86 in response to changes in the slope of the signal 80. The signal 84 varies about the ground reference level 86 by approximately one forward diode voltage drop.

As will be apparent to one skilled in the art, the signal 80 exhibits a positive slope after the occurrence of negative voltage peaks and exhibits a negative slope after the occurrence of positive voltage peaks. As such, when the slope of the signal 80 is positive, such as at point 90, the voltage at node A of the signal conditioning circuit 40 is at a higher potential than node B. This causes current to flow through capacitor $C_5$ and diode $D_2$ such that the voltage appearing between node D and ground is equal to approximately the forward voltage drop across diode $D_2$. This is represented at point 92 of the signal 84. The voltage of the signal 84 at point 92 causes the inverting (–) input 54 of the comparator 50 to be at a higher potential than the non-inverting (+) input 56. As illustrated at point 94 of the signal 88, the comparator 50 will respond by outputting a low level signal at node C which indicates that a negative voltage peak was detected.

Once the signal 80 reaches a positive peak and attains a negative slope, such as at point 96, the voltage at node A will be at a lower potential than node B. This causes the current to reverse and flow through diode $D_1$ to capacitor $C_5$. As such, the voltage appearing between node D and ground is now equal to the voltage drop across diode $D_2$. This is represented at point 98 of the signal 84. The voltage of the signal 84 at point 98 causes the inverting (–) input 54 of the comparator 50 to be at a higher potential than the non-inverting (+) input 56. As illustrated at point 100 of the signal 88, the comparator 50 will respond by outputting a high level signal at node C which indicates that a positive voltage peak was detected.

As will be apparent to one skilled in the art, the peak detecting circuit 48 is responsive to the positive and negative voltage peaks or transitions in the rate of change of voltage of the signal 80 irrespective of the signal 80 crossing the reference voltage level 82.

When forward biased by the signal 80, the diodes $D_1$ and $D_2$ in subsequent half cycles provide a dynamic resistance of only a few tens of ohms which in conjunction with capacitor $C_5$ form a high pass filter that effectively attenuates the additive noise signals generated by changes in the air gap between the VRWSS 42 and the corresponding tone wheel. As will be apparent to one skilled in the art, the impedance of the capacitor $C_5$ is inversely proportional to its capacitance value and the signal frequency. Therefore, the dynamic high pass filter formed from capacitor $C_5$ and diodes $D_1$ and $D_2$ will subject the lower frequency additive noise components of the signal 80 to greater attenuation than the speed proportional components.

At low wheel speeds, when additive noise due to axial movements is minimal, the amplitude of the signal 80 may not exceed approximately 1.2 volts peak to peak. As such, the diodes $D_1$ and $D_2$ will not be forward biased and the capacitors $C_5$ and $C_6$ will couple the signal 80 to the inverting (−) input 54 of the comparator 50. Additionally, capacitors $C_5$ and $C_6$ in conjunction with resistor $R_5$ will form a high pass filter for attenuating any low frequency additive noise components of the signal 80. By way of example, for the component values cited above, this high pass filter has a roll-off frequency of approximately 34 hertz.

As discussed above, the signal 88 outputted by the comparator 50 switches between the high and low signals each time the peak detecting circuit 48 detects positive and negative voltage peaks of the signal 80 by generating the signal 84. As such, an applicable microprocessor of an anti-lock brake system may use the signal 88 to determine the frequency of the signal 80 and the corresponding velocity of a vehicle's wheel.

Turning now to FIG. 4, a wheel speed sensor signal conditioning circuit 120 in accordance with a second embodiment of the invention is shown. The wheel speed sensor signal conditioning circuit 120 is constructed similar to the signal conditioning circuit 40 of FIG. 3. However, the signal conditioning circuit 120 is a differential circuit which may be constructed as part of a custom integrated circuit (IC). As with the signal conditioning circuit 40, a variable reluctance wheel speed sensor (VRWSS) 122, coupled between nodes A and B, is illustrated by a resistance $R_s$ in series with an inductance $L_s$. Again, the VRWSS 122 produces a sinusoidal voltage signal that is indicative of the speed of a corresponding tone wheel attached to a vehicle's wheel (not shown). The signal conditioning circuit 120 includes a band-pass filter 124 formed from capacitors $C_1$, $C_2$ and $C_3$ in conjunction with the inductance $L_s$, and a differential low-pass filter 126 which is formed from resistors $R_1$, $R_2$ and capacitor $C_4$. By way of example, the component values of the capacitors $C_1$ through $C_3$ preferably have the same component values as in the signal conditioning circuit 40. Also by way of example, resistor $R_1$ preferably has a resistance of 2k ohms, resistor $R_2$ preferably has a resistance of 2k ohms, and capacitor $C_4$ preferably has a capacitance of 0.047μ farads.

The differential low-pass filter 126 is coupled to a peak detecting circuit 128 formed from capacitors $C_5$ and $C_6$, a first series of diodes $D_1$ and $D_2$, and a second series of diodes $D_3$ and $D_4$. The diodes $D_1$ and $D_2$ are connected in series with the same polarities between capacitors $C_5$ and $C_6$, and the diodes $D_3$ and $D_4$ are connected in parallel and with opposite polarities of diodes $D_1$ and $D_2$. The signal conditioning circuit 120 further includes a comparator circuit 130 having built in hysteresis and an output line illustrated by node C. Resistors $R_3$ and $R_4$, preferably 24k ohm each, are configured such that an inverting (−) input 132 and a non-inverting (+) input 134 of the comparator 130 are referenced to approximately a 2.5 volt level.

In operation, the sinusoidal voltage from the VRWSS 122, which may be represented by the signal 80 of FIG. 5a, is applied to the band-pass filter 124 and the differential low-pass filter 126. The signal 80 is then coupled to the peak detecting circuit 128, which generates a signal similar to the signal 84 of FIG. 5b for detecting the positive and negative voltage peaks or transitions in the rate of change of voltage of the signal 80. As with the signal conditioning circuit 40, this causes the output of the comparator 130 to switch between a high and a low signal as illustrated by the signal 88 of FIG. 5c. The signal conditioning circuit 120 has improved common mode rejection characteristics due to the symmetry of the peak detecting circuit 128.

When the amplitude of the signal 80 exceeds approximately 2.4 volts peak to peak, the voltage level required to cause the first series of diodes $D_1$ and $D_2$ and the second series of diodes $D_3$ and $D_4$ to conduct in subsequent half cycles, the peak detecting circuit 128 clamps or limits the signal 80. When forward biased by the signal 80, the first series of diodes $D_1$ and $D_2$ and the second series of diodes $D_3$ and $D_4$ in subsequent half cycles provide a dynamic resistance that in conjunction with capacitors $C_5$ and $C_6$ form a dynamic high-pass filter. This dynamic high-pass filter effectively attenuates the additive noise signals generated by changes in the air gap between the VRWSS 122 and the corresponding tone wheel.

From the foregoing, it can be seen that the use of the wheel speed signal conditioning circuits 40 and 120 in conjunction with a variable reluctance wheel speed sensor and a corresponding tone wheel have several useful consequences. Compared to prior art wheel speed signal conditioning circuits, the signal conditioning circuits of the present invention effectively attenuate the low frequency additive noise signals generated by axial movements of a vehicle's wheel which cause the air gap between the variable reluctance wheel speed sensor and the corresponding tone wheel to change. Additionally, the signal conditioning circuits of the present invention may be used in conjunction with an anti-lock brake system to determine the speed of a vehicle's wheel irrespective of whether the variable reluctance wheel speed sensor's signal crosses a predetermined reference voltage level.

The foregoing discloses and describes merely exemplary embodiments of the present invention. One skilled in the art will readily recognize from such discussion, and from the accompanying drawings and claims, that various changes, modifications, and variations can be made therein without departing from the spirit and scope of the present invention as defined by the following claims.

What is claimed is:

1. A speed sensor signal conditioning circuit, comprising:
   a filter for continuously and without interruption filtering an output signal received from a speed sensor;
   a peak detector, coupled to said filter, for detecting positive and negative voltage peaks of said output signal, regardless of the magnitude of said positive and negative voltage peaks and irrespective of said output signal crossing a reference voltage level; and a comparator coupled to said peak detector for outputting a first signal when said peak detector detects said positive voltage peaks and a second signal when said peak detector detects said negative voltage peaks.

2. The speed sensor signal conditioning circuit of claim 1 wherein said peak detector is coupled to said comparator by a coupling capacitor and wherein said peak detector further limits the amplitude of said output signal to a predetermined level.

3. The speed sensor signal conditioning circuit of claim 1 wherein when said output signal exceeds a predetermined peak to peak voltage level, said peak detector further limits the amplitude of said output signal to a predetermined level and forms a dynamic high pass filter for attenuating low frequency noise signals from said output signal.

4. The speed sensor signal conditioning circuit of claim 3 wherein said filter includes a second high pass filter for further attenuating low frequency noise signals from said output signal.

5. The speed sensor signal conditioning circuit of claim 1 wherein when said output signal does not exceed a predetermined peak to peak voltage level, said peak detector and said filtering further form a high pass filter for attenuating low frequency noise signals from said output signal.

6. The speed sensor signal conditioning circuit of claim 1 wherein said filtering includes a low pass filter and a high pass filter for attenuating low frequency noise signals from said output signal.

7. The speed sensor signal conditioning circuit of claim 1 wherein said peak detector includes:

a first capacitor coupled to said filtering;

a first diode coupled between said first capacitor and ground; and a second diode connected in parallel and with opposite polarity of said first diode, whereby said first diode and said second diode limit the amplitude of said output signal when said output signal exceeds a predetermined peak to peak voltage level.

8. The speed sensor signal conditioning circuit of claim 7 wherein when said output signal exceeds said predetermined peak to peak voltage level, said first diode and said second diode provide dynamic resistances which form a high pass filter in conjunction with said first capacitor for attenuating low frequency noise signals from said output signal.

9. The speed sensor signal conditioning circuit of claim 7 wherein when said output signal does not exceed said predetermined peak to peak voltage level, said first capacitor in conjunction with said filter means form a high pass filter for attenuating low frequency noise signals from said output signal.

10. The speed sensor signal conditioning circuit of claim 1 wherein said peak detector includes:

a first capacitor coupled to said filter;

a second capacitor coupled to said filter;

a first diode circuit, coupled between said first capacitor and said second capacitor, for limiting the amplitude of positive half cycles of said output signal when said output signal exceeds a predetermined peak to peak voltage level; and a second diode circuit, connected in parallel and with opposite polarity of said first diode circuit, for limiting the amplitude of negative half cycles of said output signal when said output signal exceeds the predetermined peak to peak voltage level.

11. The speed sensor signal conditioning circuit of claim 10 wherein said first diode circuit includes a first diode and a second diode connected in series with the same polarity and wherein said second diode circuit includes a third diode and a fourth diode connected in series with opposite polarities of said first and said second diodes.

12. The speed sensor signal conditioning circuit of claim 1 wherein an output line of said comparator means is coupled to a microprocessor for determining the number of said positive and negative voltage peaks of said output signal.

13. A speed sensor signal conditioning circuit, comprising:

a low pass filter coupled to an output signal received from a speed sensor for continuously and without interruption filtering said output signal;

a peak detector, coupled to said low pass filter, for detecting positive and negative voltage transitions of said output signal irrespective of said output signal crossing a reference voltage level, said peak detector including a first capacitor coupled to said low pass filter, a first diode coupled between said first capacitor and ground, and a second diode connected in parallel and with opposite polarity of said first diode; and a comparator coupled to said peak detector by a second capacitor for outputting a first signal when said peak detector detects said positive voltage transitions and for outputting a second signal when said peak detector detects said negative voltage transitions, whereby when said output signal exceeds a predetermined peak to peak voltage level, said first diode and said second diode limit the amplitude of said output signal.

14. An anti-lock brake system for sensing the rotational speed of a vehicle via a wheel speed sensor assembly coupled to said vehicle, wherein the wheel speed sensor generates an output signal, said system being responsive to said output signal irrespective of said output signal crossing a reference voltage level, said system comprising:

a signal conditioning circuit coupled to said wheel speed sensor assembly, said signal conditioning circuit including a filter for continuously and without interruption filtering said output signal received from said wheel speed sensor, a peak detector coupled to said filter for detecting positive and negative voltage peaks of said output signal regardless of the magnitude of said positive and negative voltage peaks and irrespective of said output signal crossing said reference voltage level, and a comparator coupled to said peak detector for outputting a first signal when said peak detector detects said positive voltage peaks and a second signal when said peak detector detects said negative voltage peaks.

15. A method of detecting positive and negative voltage peaks of a sinusoidal speed sensor signal irrespective of said signal crossing a reference voltage level, comprising the steps of:

continuously and without interruption filtering predetermined frequencies from said speed sensor signal;

limiting positive and negative voltage peaks of said speed sensor signal if a predetermined peak to peak voltage level is exceeded;

generating a first voltage signal that changes value between a first level and a second level in response to changes in slope of said speed sensor signal voltage, regardless of the magnitude of said positive and negative voltage peaks;

comparing said first voltage signal with a threshold voltage; and generating an output signal as a function of the comparison of said first voltage signal with said threshold level.

16. The method of claim 15 wherein the step of filtering predetermined frequencies from said speed sensor signal includes dynamically filtering the speed sensor signal if the predetermined peak to peak voltage level is exceeded.

17. The method of claim 15 wherein the step of limiting includes limiting the speed sensor signal to a peak to peak voltage level approximately equal to two diode voltage drops.

18. The method of claim 15 wherein said step of generating said first voltage signal further includes the step of applying said speed sensor signal to a node between a capacitor and two diodes coupled in parallel with opposite polarities between said node and ground.

19. The method of claim 15 wherein said step of generating said first voltage signal further includes the step of applying said speed sensor signal to two pairs of series connected diodes coupled in parallel between a first capacitor and a second capacitor.

20. A method of detecting positive and negative voltage peaks of a sinusoidal speed sensor signal irrespective of said signal crossing a reference voltage level, comprising the steps of:

continuously and without interruption filtering predetermined frequencies from said speed sensor signal;

limiting positive and negative voltage peaks of said speed sensor signal if a predetermined peak to peak voltage level is exceeded;

generating a first voltage signal that changes value between a first level and a second level in response to changes in slope of said speed sensor signal voltage;

comparing said first voltage signal with a threshold voltage;

generating an output signal as a function of the comparison of said first voltage signal with said threshold level; and wherein the step of filtering predetermined frequencies from said speed sensor signal includes dynamically filtering the speed sensor signal if the predetermined peak to peak voltage level is exceeded.

21. A method of detecting positive and negative voltage peaks of a sinusoidal speed sensor signal irrespective of said signal crossing a reference voltage level, comprising the steps of:

continuously and without interruption filtering predetermined frequencies from said speed sensor signal;

limiting positive and negative voltage peaks of said speed sensor signal if a predetermined peak to peak voltage level is exceeded;

generating a first voltage signal that changes value between a first level and a second level in response to changes in slope of said speed sensor signal voltage;

comparing said first voltage signal with a threshold voltage;

generating an output signal as a function of the comparison of said first voltage signal with said threshold level; and wherein the step of limiting includes limiting the speed sensor signal to a peak to peak voltage level approximately equal to two diodes voltage drops.

22. A method of detecting positive and negative voltage peaks of a sinusoidal speed sensor signal irrespective of said signal crossing a reference voltage level, comprising the steps of:

continuously and without interruption filtering predetermined frequencies from said speed sensor signal;

limiting positive and negative voltage peaks of said speed sensor signal if a predetermined peak to peak voltage level is exceeded;

generating a first voltage signal that changes value between a first level and a second level in response to changes in slope of said speed sensor signal voltage;

comparing said first voltage signal with a threshold voltage;

generating an output signal as a function of the comparison of said first voltage signal with said threshold level; and wherein said step of generating said first voltage further includes the step of applying said speed sensor signal to a node between a capacitor and two diodes coupled in parallel with opposite polarities between said node and ground.

23. A method of detecting positive and negative voltage peaks of a sinusoidal speed sensor signal irrespective of said signal crossing a reference voltage level, comprising the steps of:

continuously and without interruption filtering predetermined frequencies from said speed sensor signal;

limiting positive and negative voltage peaks of said speed sensor signal if a predetermined peak to peak voltage level is exceeded;

generating a first voltage signal that changes value between a first level and a second level in response to changes in slope of said speed sensor signal voltage;

comparing said first voltage signal with a threshold voltage;

generating an output signal as a function of the comparison of said first voltage signal with said threshold level; and wherein said step of generating said first voltage signal further includes the step of applying said speed sensor signal to two pairs of series connected diodes coupled in parallel between a first capacitor and a second capacitor.

* * * * *